US010449819B2

(12) United States Patent
Delorenzis et al.

(10) Patent No.: US 10,449,819 B2
(45) Date of Patent: Oct. 22, 2019

(54) DAMPING CONVOLUTED AIR SPRING

(71) Applicant: Watson & Chalin Manufacturing, Inc., McKinney, TX (US)

(72) Inventors: Damon Delorenzis, Plainfield, IL (US); Michael J. Gottschalk, McKinney, TX (US); Matthew J. Van Meter, Plainfield, IL (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 0 days.

(21) Appl. No.: 15/915,123

(22) Filed: Mar. 8, 2018

(65) Prior Publication Data

US 2018/0257449 A1  Sep. 13, 2018

Related U.S. Application Data

(60) Provisional application No. 62/468,988, filed on Mar. 9, 2017.

(51) Int. Cl.
*F16F 9/04* (2006.01)
*B60G 11/27* (2006.01)
*B60G 15/10* (2006.01)
*F16F 7/10* (2006.01)
(Continued)

(52) U.S. Cl.
CPC ............. *B60G 15/10* (2013.01); *B60G 11/27* (2013.01); *F16F 7/10* (2013.01); *F16F 7/112* (2013.01); *F16F 9/04* (2013.01); *F16F 9/049* (2013.01); *F16F 9/0418* (2013.01); *F16F 9/0472* (2013.01); *B60G 2202/152* (2013.01); *B60G 2202/20* (2013.01); *B60G 2202/32* (2013.01); *B60G 2206/424* (2013.01); *F16F 9/0445* (2013.01); *F16F 9/585* (2013.01)

(58) Field of Classification Search
CPC .......... F16F 9/04; F16F 9/0418; F16F 9/0472; F16F 9/049; F16F 9/05; F16F 9/055; B60G 11/07; B60G 15/10; B60G 2202/152
USPC ................. 267/64.23, 64.27, 122; 105/198.1
See application file for complete search history.

(56) References Cited

U.S. PATENT DOCUMENTS

| 1,516,004 A | 11/1924 | Eckrode et al. |
| 2,773,686 A | 12/1956 | Nash |
| 2,842,359 A | 7/1958 | Auer |

(Continued)

FOREIGN PATENT DOCUMENTS

| DE | 102010045567 A1 | 3/2012 |
| WO | 0240888 A1 | 5/2002 |

OTHER PUBLICATIONS

EPO machine translation, DE 10 2010 045 567 A1, Miller, Mar. 2012. (Year: 2012).*

*Primary Examiner* — Thomas J Williams
(74) *Attorney, Agent, or Firm* — Dureska & Moore, LLC; David P. Dureska; Brent L. Moore

(57) ABSTRACT

A damping convoluted air spring for use in vehicle axle/suspension systems includes a top plate, a bottom plate, and a bellows. The bellows includes a first lobe, a second lobe, and a third lobe operatively connected to one another. The first lobe being in fluid communication with the second lobe. The second lobe being in fluid communication with said third lobe. The first lobe operatively mounted on the top plate. The third lobe operatively mounted on the bottom plate. The second lobe includes a fixed volume under pressure to provide damping to the air spring during operation of the vehicle.

15 Claims, 14 Drawing Sheets

(51) Int. Cl.
*F16F 7/112* (2006.01)
*F16F 9/58* (2006.01)

(56) References Cited

U.S. PATENT DOCUMENTS

| | | | | |
|---|---|---|---|---|
| 2,887,069 | A | * | 5/1959 | Lich .......................... B61F 5/14 |
| | | | | 105/194 |
| 2,902,291 | A | | 9/1959 | Walker |
| 2,926,011 | A | | 2/1960 | Slemmons et al. |
| 2,936,860 | A | * | 5/1960 | Peras ........................ F16F 9/16 |
| | | | | 188/298 |
| 3,063,732 | A | | 11/1962 | Harbers et al. |
| 3,212,769 | A | | 10/1965 | Ishibashi et al. |
| 3,343,830 | A | * | 9/1967 | Dean .......................... B61F 5/14 |
| | | | | 105/198.1 |
| 4,064,977 | A | * | 12/1977 | Taylor ..................... F16F 9/088 |
| | | | | 188/268 |
| 5,087,020 | A | | 2/1992 | Weber et al. |
| 5,111,735 | A | | 5/1992 | Johnson |
| 6,691,989 | B1 | | 2/2004 | Leonard |
| 9,139,061 | B2 | | 9/2015 | Delorenzis |
| 9,849,745 | B2 | | 12/2017 | Fulton et al. |
| 2013/0099459 | A1 | | 4/2013 | Remboski et al. |
| 2014/0300075 | A1 | | 10/2014 | Delorenzis |

* cited by examiner

DAMPING CONVOLUTED AIR SPRING

CROSS-REFERENCE TO RELATED APPLICATION

This application claims the benefit of U.S. Provisional Patent Application Ser. No. 62/468,988, filed Mar. 9, 2017.

BACKGROUND OF THE INVENTION

Field of the Invention

The invention relates to medium duty vehicles and heavy-duty vehicle trucks and tractor-trailers. More particularly, the invention is directed to an air-ride axle/suspension system for a medium-duty or heavy-duty vehicle. More specifically, the invention is directed to a multiple lobe damping convoluted air spring for air-ride axle/suspension systems of medium-duty or heavy-duty vehicle trucks and tractor-trailers. More particularly, the multiple lobe damping convoluted air spring includes a rigid lobe having an internal chamber that is in fluid communication with the other lobes via at least one opening formed through the wall(s) of the chamber and adjacent lobes. This structure and arrangement provides restricted airflow between the chamber and the lobes in order to promote damping of the convoluted air spring during operation of the vehicle at a first frequency range, and the rigid lobe includes a mass that promotes mass damping of the convoluted air spring during operation of the vehicle at a second frequency range.

Background Art

The use of air-ride trailing and leading arm rigid beam-type axle/suspension systems has been very popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or its equivalent, which in turn is connected to a respective one of the main members. A height control valve is mounted on the main member or other support structure and is operatively connected to the beam and to the air spring in order to maintain the ride height of the vehicle. A brake system and one or more shock absorbers for providing damping to the axle/suspension system of the vehicle in those situations where the air spring is of the non-damping variety also are mounted on the axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

In an alternative configuration, each suspension assembly of the axle/suspension system may include a pair of longitudinally extending elongated beams spaced above and below one another in a generally parallelogram configuration. Each one of the pair of beams is pivotally connected to a hanger at the front end of each beam. Each of the upper and lower trailing beams is pivotally connected to an axle assembly at the rear end of each beam. The upper and lower trailing beams form a parallelogram, or modified parallelogram type of suspension system. Thus, two hangers and two each of the upper and lower trailing beams are provided in the axle/suspension system, one of each on each lateral side of the axle/suspension system.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is the air spring, while a shock absorber typically provides damping characteristics to the axle/suspension system.

The typical air spring of the type utilized in heavy-duty air-ride axle/suspension systems can be of the rolling lobe type or the convoluted type. The rolling lobe type air spring includes three main components: a flexible bellows, a piston and a bellows top plate. The bellows is typically formed from rubber or other flexible material, and is operatively mounted on top of the piston. The piston is typically formed from steel, aluminum, fiber reinforced plastics or other rigid material, and is mounted on the rear end of the top plate of the beam of the suspension assembly by a pedestal and fasteners, which are generally well known in the art. The volume of pressurized air, or "air volume", that is contained within the air spring is a major factor in determining the spring rate of the air spring. More specifically, this air volume is contained within the bellows and, in some cases, the piston of the air spring. The larger the air volume of the air spring, the lower the spring rate of the air spring. A lower spring rate is generally more desirable in the heavy-duty vehicle industry because it provides a softer ride to the vehicle during operation. Typically, the piston either contains a hollow cavity, which is in communication with the bellows and which adds to the air volume of the air spring by allowing unrestricted communication of air between the piston and the bellows volumes, or the piston has a generally hollow cylindrical-shape and does not communicate with the bellows volume, whereby the piston does not contribute to the air volume of the air spring.

The convoluted type air spring includes three main components: a flexible bellows, a top plate and a bottom plate. The bellows is typically formed from rubber or other flexible or elastic material, and is operatively mounted at its top end to the top plate and at its bottom end to the bottom plate of the air spring. The top plate is connected to an air spring bracket that is in turn mounted to the main member of the vehicle. The top plate can also be directly connected to the main member of the vehicle without use of the air spring bracket. The bottom plate of the air spring is mounted on the axle assembly of the axle/suspension system. The volume of pressurized air, or "air volume", that is contained within the air spring is a major factor in determining the spring rate of the air spring. More specifically, this air volume is contained within the bellows for a convoluted air spring. The larger the air volume of the air spring, the lower the spring rate of the air spring. A lower spring rate is generally more desirable in the heavy-duty vehicle industry because it provides a softer ride to the vehicle during operation. The convoluted type of air spring is typically utilized in applications where the spacing or clearance between the suspension assembly and the main member of the vehicle is insufficient to allow for the rolling lobe type of air spring.

For both types of air springs described above, the air volume of the air spring is in fluid communication with an air source, such as an air supply tank, and also is typically in fluid communication with the height control valve of the vehicle. The height control valve, by directing air flow into and out of the air spring of the axle/suspension system, helps maintain the desired ride height of the vehicle.

Prior art air springs such as the ones described above, while providing cushioning to the vehicle cargo and occupant(s) during operation of the vehicle, provide little if any damping characteristics to the axle/suspension system. Such damping characteristics are instead typically provided by a pair of hydraulic shock absorbers, although a single shock absorber has also been utilized and is generally well known in the art. Each one of the shock absorbers is mounted on and extends between the suspension assembly of the axle/suspension system and the main member of the vehicle. These shock absorbers add complexity and weight to the axle/suspension system. Moreover, because the shock absorbers are a service item of the axle/suspension system that will require maintenance and/or replacement from time to time, they also add additional maintenance and/or replacement costs to the axle/suspension system.

For heavy-duty vehicle trucks and trailers, the frequencies where optimal damping of the axle/suspension system(s) is critical are from about 1.8 Hz, body bounce mode, to about 13 Hz, wheel hop mode. At these natural frequencies, the axle/suspension system is predisposed to move, so road inputs at these frequencies can result in a build-up of movement in the axle/suspension system that can potentially adversely affect the performance of the axle/suspension system. Therefore, it is critical to provide damping across all critical frequencies in order to promote optimal performance of the heavy-duty vehicle.

The amount of cargo that a vehicle may carry is governed by local, state, and/or national road and bridge laws. The basic principle behind most road and bridge laws is to limit the maximum load that a vehicle may carry, as well as to limit the maximum load that can be supported by individual axles. Because shock absorbers are relatively heavy, these components add undesirable weight to the axle/suspension system and therefore reduce the amount of cargo that can be carried by the heavy-duty vehicle. Depending on the shock absorbers employed, they also add varying degrees of complexity to the axle/suspension system, which is also undesirable.

Certain prior art air springs of the rolling lobe variety have been designed to provide damping characteristics to the air spring. One such damping rolling lobe type air spring is shown and described in U.S. Pat. No. 8,540,222, which is owned by Hendrickson USA, L.L.C.

In addition, a prior art convoluted air spring has been designed to provide damping characteristics utilizing an external tank. That convoluted air spring is shown and described in U.S. Pat. No. 9,139,061, which is owned by the assignee of the instant application.

Although useful for its intended purpose, the damping convoluted air spring of the '061 patent requires additional tanks and conduits that can reduce the amount of space available to the axle/suspension system. Moreover, the external conduits can become damaged by road debris during operation of the heavy-duty vehicle, which can potentially affect the operation and damping of the convoluted air springs and can also require repair that can potentially increase maintenance costs of the axle/suspension system.

The damping convoluted air spring for medium-duty or heavy-duty vehicles of the present invention overcomes the problems associated with prior art damping and non-damping convoluted air springs by providing a damping convoluted air spring that is self-contained, resulting in an air spring that has damping characteristics optimized across the entire critical frequency range while using generally fewer and smaller parts than prior art damping convoluted air springs that include external tanks and the like. The damping convoluted air spring for medium-duty or heavy-duty vehicles includes a rigid lobe that forms an intermediate chamber within the bellows of the air spring that is in fluid communication with the upper and lower lobes of the air spring, to provide restricted airflow between the lobes of the air spring and the intermediate chamber in order to provide damping characteristics to the air spring at a first frequency range. These damping characteristics provided by restricted airflow can be tuned for a given application, based upon the intermediate chamber volume, the volume of the upper and lower lobes, and the size, shape, length, and/or number of openings formed between and communicating with the lobes and the intermediate chamber of the air spring. The rigid lobe also includes a mass. The rigid lobe is connected or suspended between and by the pliable upper and lower lobes of the air spring bellows. In response to the motion of an axle assembly of an axle/suspension system mounted on the vehicle, either in a jounce or rebound event, the rigid lobe moves generally opposite or counter to the motion of the axle assembly due to the inertia of the rigid lobe mass. The generally opposite, counter, or out of phase motion of the rigid lobe dissipates the motion energy of the axle assembly, thereby providing mass damping characteristics to the convoluted air spring at a second frequency range. The mass damping characteristics provided by the mass of the rigid chamber can be tuned for a given application, based upon the rigid lobe mass as well as the stiffness or pliability of the lobes to which the rigid lobe mass is connected and the volumes of air the pliable lobes contain.

By providing a damping convoluted air spring for medium-duty or heavy-duty vehicles that exhibits damping features, the shock absorber(s) of the axle/suspension system can be eliminated or its size reduced, reducing complexity, saving weight and cost, and allowing the vehicle to haul more cargo. Moreover, elimination of the external tank, valves and hardware of the prior art damping convoluted air spring potentially eliminates costly repairs and/or maintenance costs associated with these more complicated systems, as well as reducing weight. In addition, the damping convoluted air spring for vehicles of the present invention can provide damping in certain applications that, in the past, had not utilized shock absorbers, and instead allowed the axle/suspension system to operate without damping, thereby increasing the life of the axle/suspension system and its component parts by reducing excessive wheel bounce during operation of the vehicle. Further, the damping convoluted air spring of the present invention provides damping characteristics optimized across all critical frequency ranges: at a first frequency range, damping is promoted by the restricted airflow between the rigid chamber and the lobes; and at a second frequency range, mass damping is promoted by the rigid lobe mass motion which is generally opposite or counter to the motion of the axle/suspension system.

SUMMARY OF THE INVENTION

Objectives of the present invention include providing a damping convoluted air spring for vehicles that exhibits damping characteristics optimized across all critical frequency ranges.

A further objective of the present invention is to provide a damping convoluted air spring for vehicles that allows for the elimination or reduction in size of the shock absorber(s) of the axle/suspension system, thus reducing complexity, saving weight and cost, and allowing the vehicle to haul more cargo.

Yet another objective of the present invention is to provide a damping convoluted air spring for vehicles that operates without external tanks, valves, or hardware thereby eliminating possible costly repairs and maintenance and reducing weight.

Still another objective of the present invention is to provide a damping convoluted air spring for vehicles that can provide damping in applications that had not previously utilized shock absorbers, thereby extending the life of the axle/suspension system and component parts.

These objectives and advantages are obtained by the damping convoluted air spring for use in vehicle axle/suspension systems which includes a top plate, a bottom plate, and a bellows. The bellows includes a first lobe, a second lobe, and a third lobe operatively connected to one another. The first lobe being in fluid communication with the second lobe. The second lobe being in fluid communication with the third lobe. The first lobe operatively mounted on the top plate. The third lobe operatively mounted on the bottom plate, wherein the second lobe includes a fixed volume under pressure to provide damping to the air spring during operation of the vehicle.

BRIEF DESCRIPTION OF THE SEVERAL VIEWS OF THE DRAWINGS

Exemplary embodiments of the present invention, illustrative of the best mode in which applicants have contemplated applying the principles, are set forth in the following description and are shown in the drawings, and are particularly and are distinctly pointed out and set forth in the appended claims.

Similar numerals refer to similar parts throughout the drawings.

DESCRIPTION OF THE PREFERRED EMBODIMENT

Figure 1:
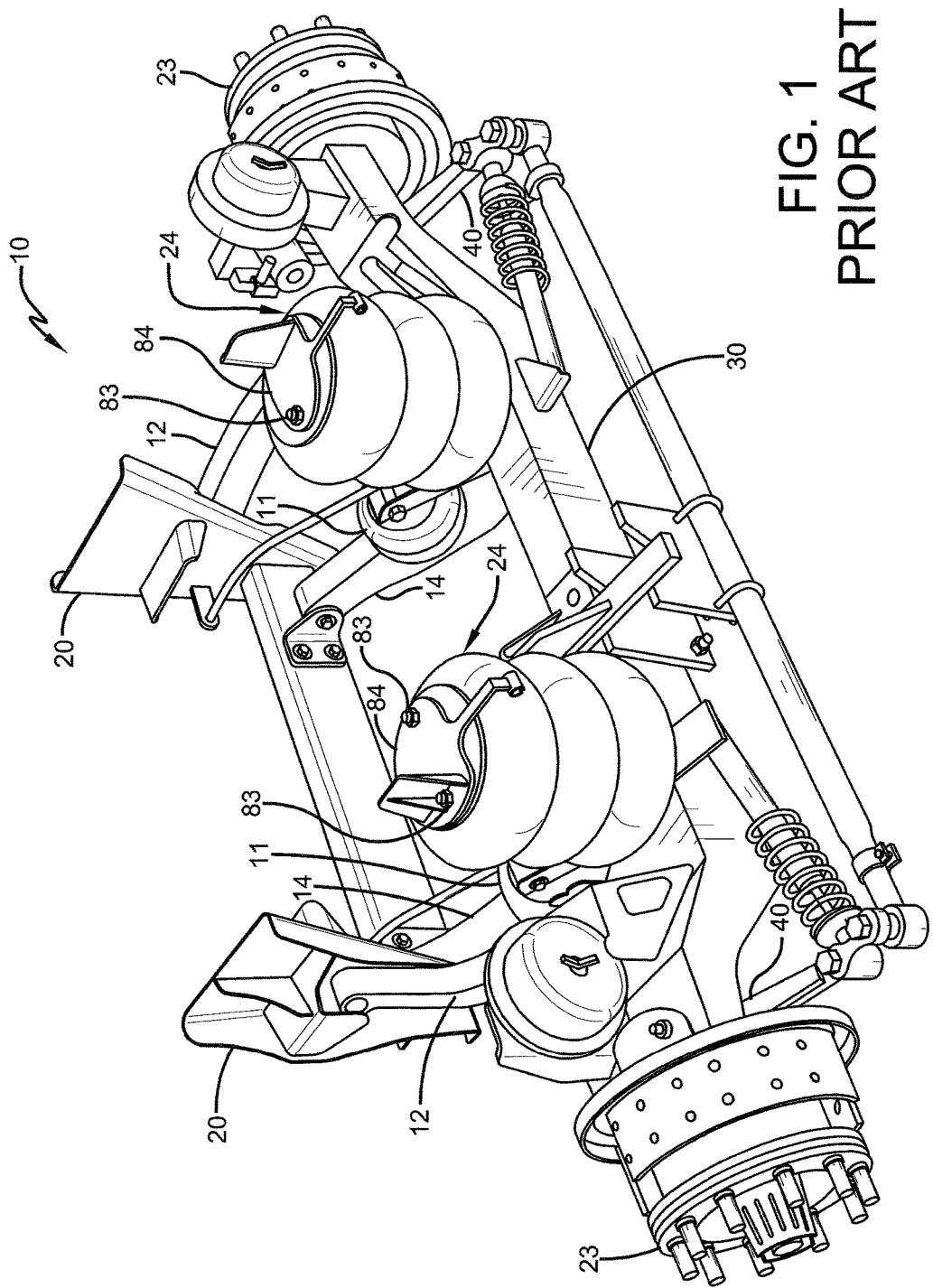
FIG. 1 is a driver side top perspective view of an auxiliary liftable and steerable axle/suspension system for a heavy-duty vehicle utilizing a prior art non-damping convoluted air spring.

In order to understand the environment in which the exemplary embodiment damping convoluted air spring of the present invention is utilized, an auxiliary liftable and steerable truck axle/suspension system is generally shown at reference numeral 10 in FIG. 1, and will be described in detail below.

Axle/suspension system 10 is a self-steering auxiliary lift-axle type suspension system having a generally parallelogram, trailing beam geometry. Axle/suspension system 10 typically is a relatively lightweight suspension, designed to permit compliance with any applicable bridge weight and stress regulations, such as the Federal Bridge Formula associated with the relevant laws and regulations applicable within the United States of America.

With respect to axle/suspension system 10, the majority of the components positioned on the driver side of the vehicle will have correspondingly similar components positioned on the curbside of the vehicle. Accordingly, in this description, when reference is made to a particular suspension component, it will be understood that a similar component is present on the opposite side of the vehicle, unless otherwise apparent.

With continued reference to FIG. 1, axle/suspension system 10 includes an axle assembly 30 which is connected to a pair of hangers 20 by upper and lower trailing arms or beams 12, 14, respectively. More specifically, each of the upper and lower trailing beams 12,14 is pivotally connected to axle assembly 30 and to a respective one of hangers 20, thereby forming a parallelogram, or modified parallelogram type of axle/suspension system. Thus, two hangers 20 and two each of the upper and lower trailing beams 12,14 are provided in axle/suspension system 10, one of each on each lateral side of the axle/suspension system.

Axle assembly 30 includes a spindle (not shown) pivotally mounted at each end of the axle assembly by a steering assembly 40. Thus, axle/suspension system 10 is also a steerable type of axle/suspension system.

Axle/suspension system 10 also includes a lift actuator 11 that is connected between lower trailing beam 14 and axle assembly 30 such that when the lift actuator is activated, the axle assembly is raised relative to the main member (not shown) to raise a pair of wheel assemblies 23 and the wheels (not shown) mounted on them away from the road surface.

A convoluted air spring 24 is mounted on an upper platform (not shown) that is in turn mounted on axle assembly 30. Convoluted air spring 24 suspends the vehicle main member (not shown) above axle assembly 30. Air is exhausted from convoluted air spring 24 when lift actuator 11 is activated, thereby permitting axle assembly 30 to be lifted toward the main members of the vehicle and thereby raising the wheels (not shown) of the vehicle out of engagement with the ground surface.

Figure 2:
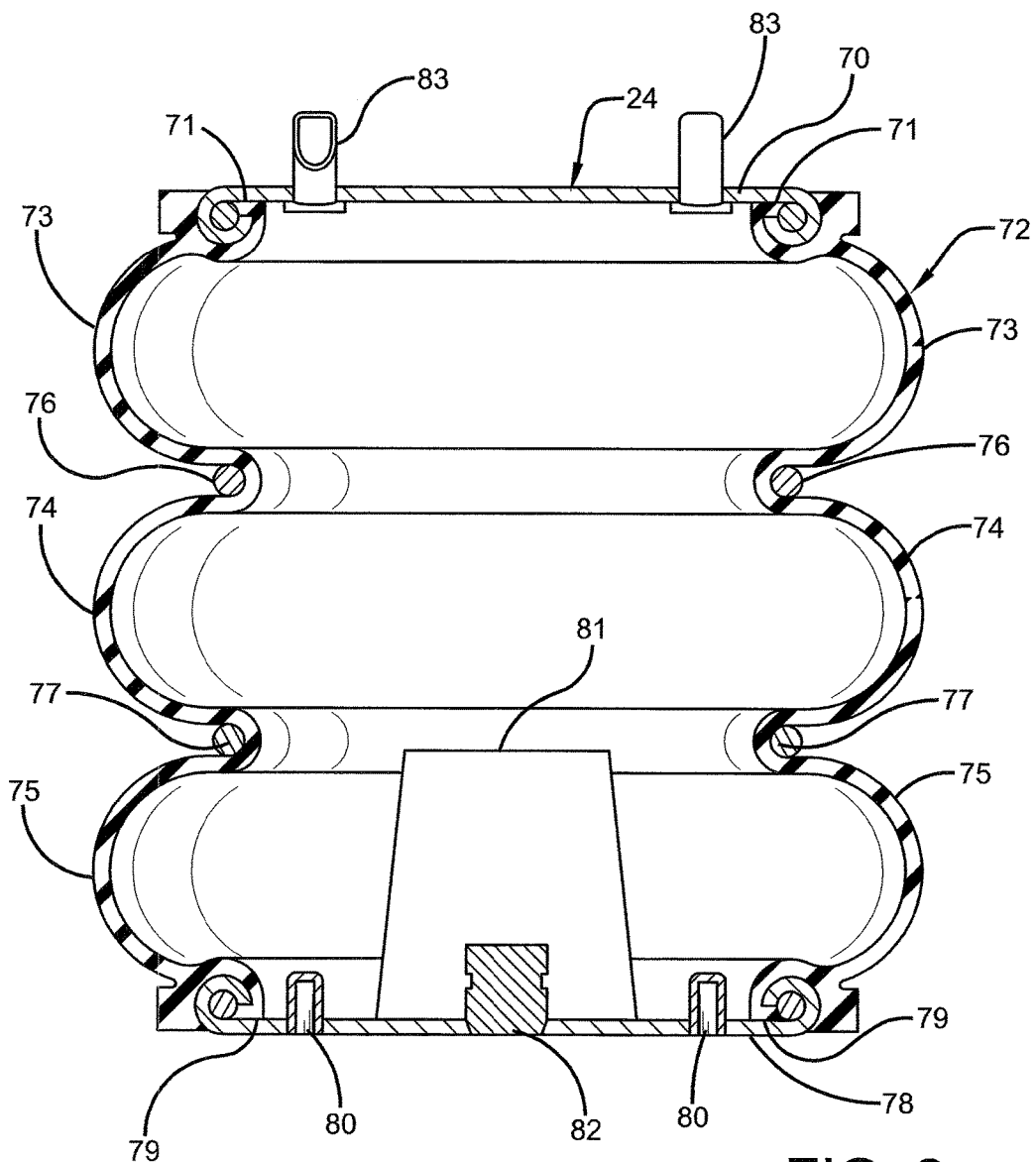
FIG. 2 is a side elevational view in section of the prior art non-damping convoluted air spring shown in FIG. 1, showing the bumper extending upwardly from the bottom plate of the convoluted air spring.
Figure 3:
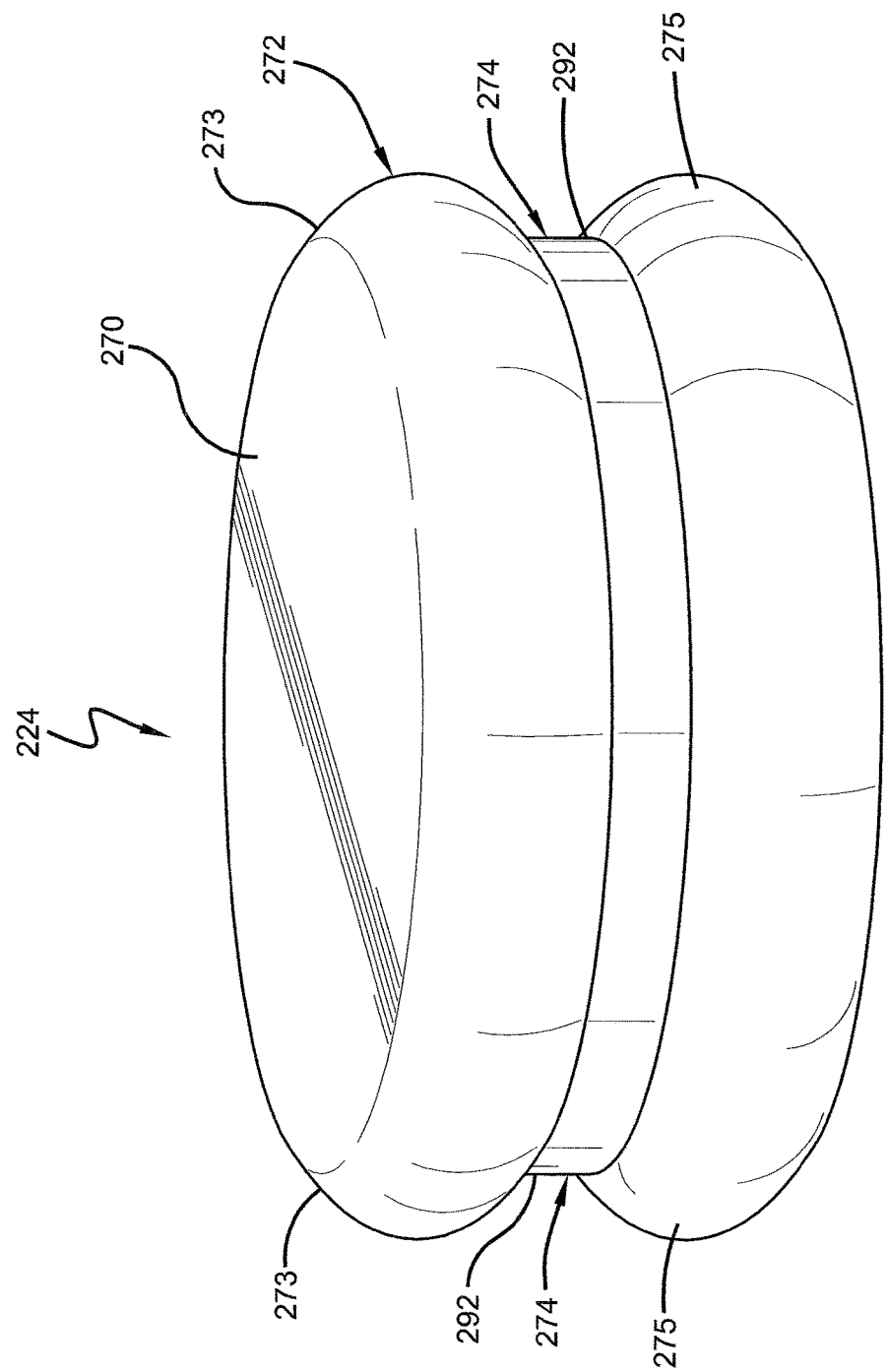
FIG. 3 is a top perspective view of a first exemplary embodiment damping convoluted air spring of the present invention, showing the upper and lower lobes of the air spring separated by a rigid intermediate chamber.
Figure 4:
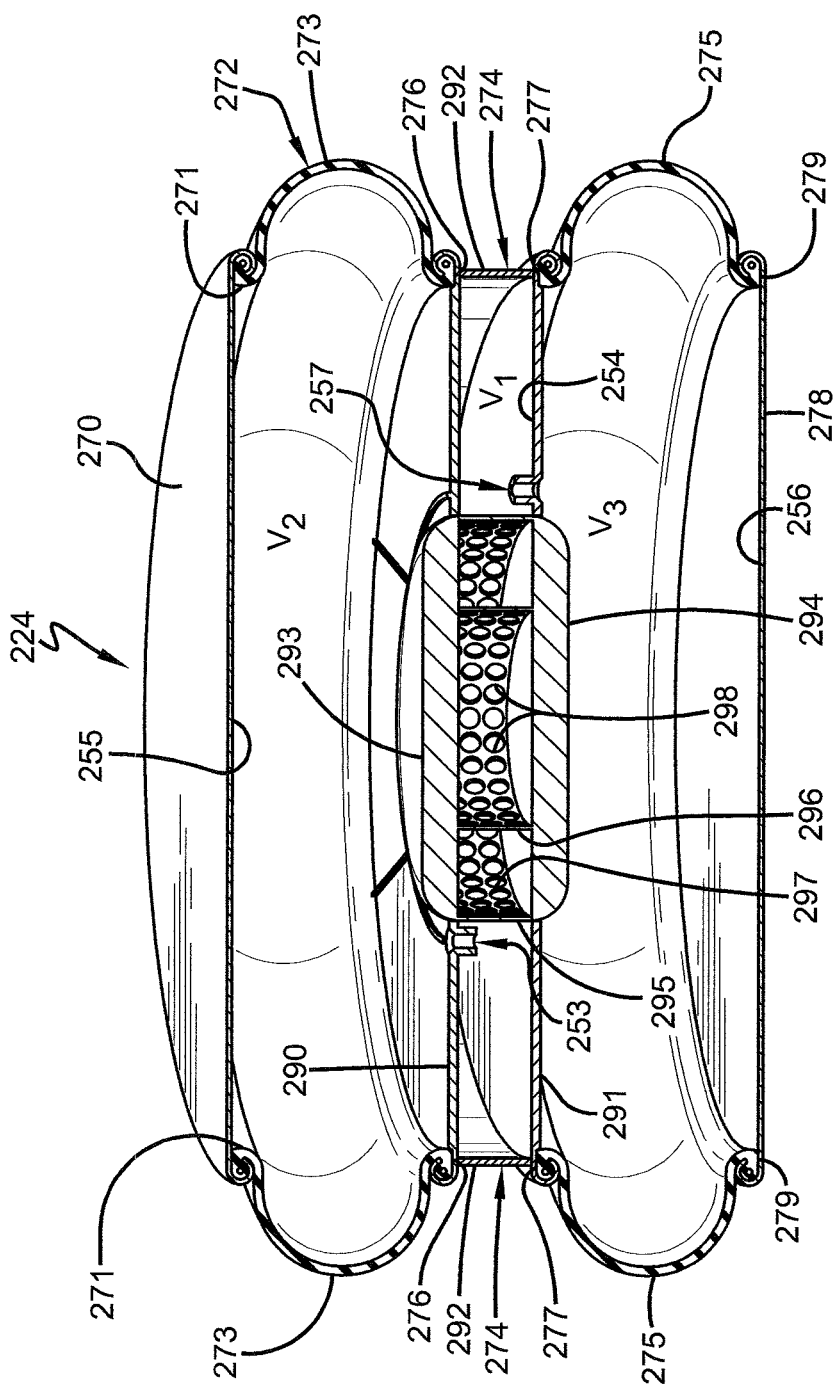
FIG. 4 is a top perspective cross-sectional view of the first exemplary embodiment damping convoluted air spring of the present invention shown in FIG. 3, showing the intermediate chamber disposed between and in fluid communication with the upper and lower lobes of the air spring via a pair of spaced apart openings.

Convoluted air spring 24 is a convoluted type of air spring that is generally well known in the art, is shown in FIG. 2 in section, and will now be described in detail below. Convoluted air spring 24 does not provide damping to axle/suspension system 10 while in operation. As such, prior art convoluted air spring 24 is typically referred to as a non-damping convoluted air spring.

Turning now to FIG. 2, prior art non-damping convoluted air spring 24 includes a top plate 70 formed from steel or other sufficiently robust material, and is operatively attached to a top end 71 of a flexible bellows 72, which is formed from rubber or other generally elastic and/or pliable material. Flexible bellows 72 includes an upper lobe 73, a middle lobe 74, and a lower lobe 75. An upper girdle hoop 76 is disposed between upper lobe 73 and middle lobe 74. A lower girdle hoop 77 is disposed between middle lobe 74 and lower lobe 75. A bottom plate 78, formed from steel or other sufficiently robust material, is operatively attached to a bottom end 79 of flexible bellows 72. A pair of fastening means 80 engage a pair of fasteners (not shown) to attach bottom plate 78 to an upper platform (not shown), which is in turn mounted on axle assembly 30 (FIG. 1). A bumper 81 formed from rubber or other pliable material is disposed on the top surface of bottom plate 78 within flexible bellows 72 and is mounted on the bottom plate by a fastener 82. Top plate 70 includes a pair of fasteners 83 disposed through the top plate that are utilized to attach the top plate to an air spring frame bracket 84 (FIG. 1). Air spring frame bracket 84 is in turn attached to a respective one of the main members of the vehicle frame (not shown). Bumper 81 extends upwardly from bottom plate 78 to prevent top plate 70 and bottom plate 78 from contacting one another during operation of the vehicle, and to prevent the top plate and the bottom plate from damaging one another during operation of the vehicle and during "low pressure" or "no air" events.

Prior art non-damping convoluted air springs 24, such as the one described above, while providing cushioning to the vehicle cargo and occupant(s) during operation of the vehicle, provide little if any damping characteristics to the axle/suspension system. Such damping characteristics are instead typically provided by a pair of hydraulic shock absorbers (not shown), although a single shock absorber has also been utilized and is generally well known in the art. Each one of the shock absorbers (not shown) is mounted on and extends between the axle/suspension system and a respective one of the main members of the vehicle. These shock absorbers (not shown) add complexity and weight to the axle/suspension system. Moreover, because the shock absorbers (not shown) are a service item of the axle/suspension system that will require maintenance and/or replacement from time to time, they also add additional maintenance and/or replacement costs to the axle/suspension system.

In addition, in some applications, prior art non-damping convoluted air springs 24 are utilized without shock absorbers, as shown in FIG. 1 above, and the axle/suspension system is allowed to operate without damping, which can potentially reduce the life of axle/suspension system 10 and its component parts due to excessive wheel bounce during operation of the heavy-duty vehicle.

The exemplary embodiments of the damping convoluted air spring of the present invention overcome the problems associated with prior art non-damping convoluted air springs set forth above, and will now be described in detail below.

Turning now to FIGS. 3-6, a first exemplary embodiment damping convoluted air spring of the present invention is shown generally at reference numeral 224 and will be described in detail below. Like prior art non-damping convoluted air spring 24, exemplary embodiment damping convoluted air spring 224 can be utilized on axle/suspension system 10 as described above, but can also be utilized on other types of air-ride axle/suspension systems for heavy-duty vehicles, including those used on trucks, trailers and the like, without changing the overall concept or operation of the present invention.

First exemplary embodiment damping convoluted air spring 224 includes a top plate 270 formed from steel or other sufficiently rigid material that is operatively attached to a top end 271 of a bellows 272 in a well-known manner. Bellows 272 includes an upper lobe 273, a rigid middle lobe 274, and a lower lobe 275. Upper lobe 273 and lower lobe 275 are formed generally from rubber or other elastic and/or pliable material. Rigid middle lobe 274 is formed from steel or other sufficiently robust material, so that the interior volume of the chamber does not change during dynamic spring movements. An upper girdle hoop 276 is disposed between upper lobe 273 and rigid middle lobe 274. A lower girdle hoop 277 is disposed between rigid middle lobe 274 and lower lobe 275. An air spring bottom plate 278, formed from steel or other sufficiently robust material, is operatively attached to a bottom end 279 of lower lobe 275 of bellows 272 in a well-known manner. A pair of fastening means (not shown) engage a pair of fasteners (not shown) to attach air spring bottom plate 278 to a platform (not shown) that is in turn mounted on the axle assembly. It should be understood that first exemplary embodiment damping convoluted air spring 224 of the present invention could include more than three lobes, such as four or more lobes, wherein one or more of the lobes is rigid while the other lobes are flexible and/or elastic, without changing the overall concept or operation of the present invention.

Rigid middle lobe 274 includes a top plate 290 and a bottom plate 291. Top plate 290 and bottom plate 291 are generally circular in shape and are spaced from one another. An outer vertically extending generally circular wall 292 is formed around the outer diameter of top plate 290 and bottom plate 291 and rigidly connects the top plate to the bottom plate. Top plate 290 is formed with an upwardly extending bumper 293 disposed at its center. Bottom plate 291 is formed with a downwardly extending bumper 294 disposed at its center. A pair of outer and inner generally circular vertically extending support columns 295,296, respectively, are arranged concentrically to each other, extend between top plate 290 and bottom plate 291, and connect the central portion of the top plate to the central portion of the bottom plate. Outer and inner support columns 295,296 are formed with a plurality of openings 297, 298, respectively, in order to promote the free flow of air within rigid middle lobe 274. Outer and inner support columns 295,296 provide bumper support to rigid middle lobe 274, and also serve to prevent air spring bottom plate 278 from contacting air spring top plate 270 during operation of the vehicle and during "low pressure" or "no air" events. Top plate 290, bottom plate 291 and outer wall 292 of rigid middle lobe 274 form an intermediate chamber 254 having a volume V1.

Air spring top plate 270, upper lobe 273 and rigid middle lobe top plate 290 form an upper air spring chamber 255 having a volume V2.

Air spring bottom plate 278, lower lobe 275 and rigid middle lobe bottom plate 291 form a lower air spring chamber 256 having a volume V3.

In accordance with an important feature of the present invention, an opening 253 is formed in top plate 290 of rigid middle lobe 274. Top plate opening 253 provides fluid communication between intermediate chamber 254 and upper air spring chamber 255. An opening 257 is formed in bottom plate 291 of rigid middle lobe 274. Bottom plate opening 257 provides fluid communication between intermediate chamber 254 and lower air spring chamber 256.

Figure 5:
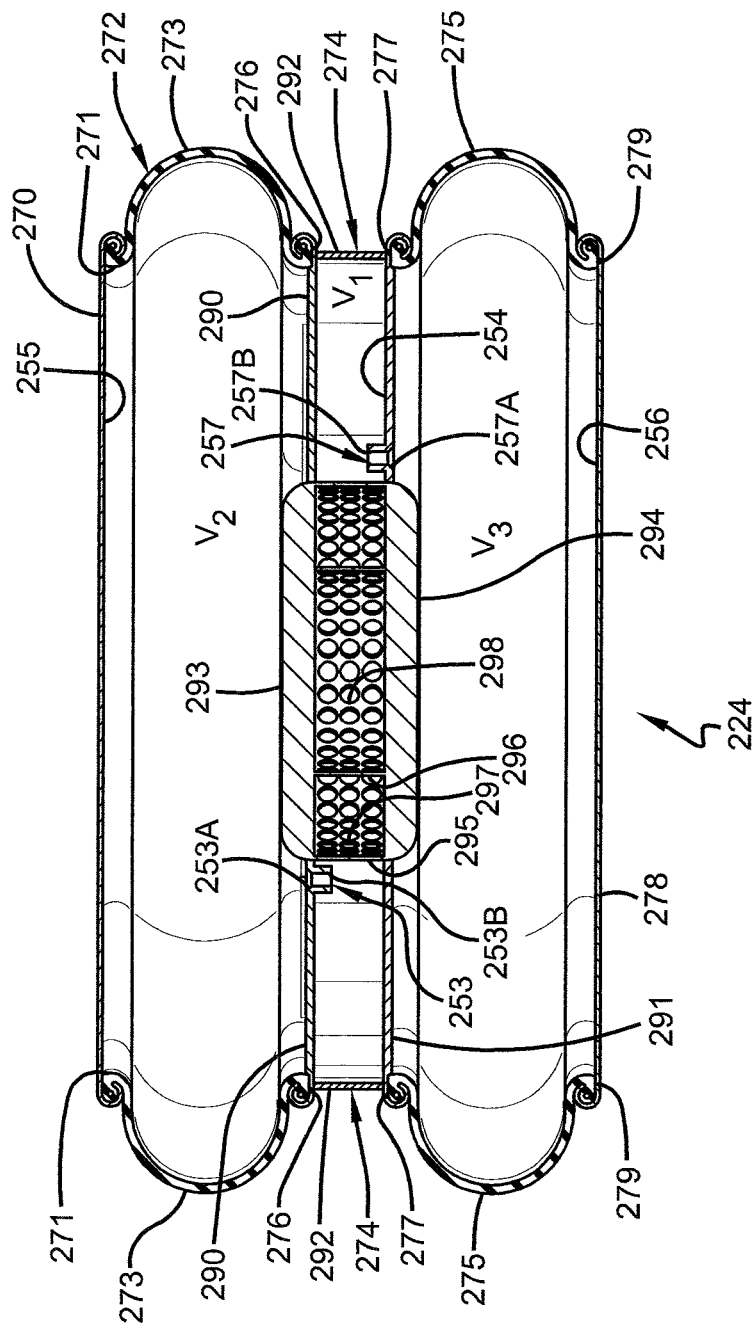
FIG. 5 is an elevational cross-sectional view of the first exemplary embodiment damping convoluted air spring of the present invention shown in FIG. 3.
Figure 6:
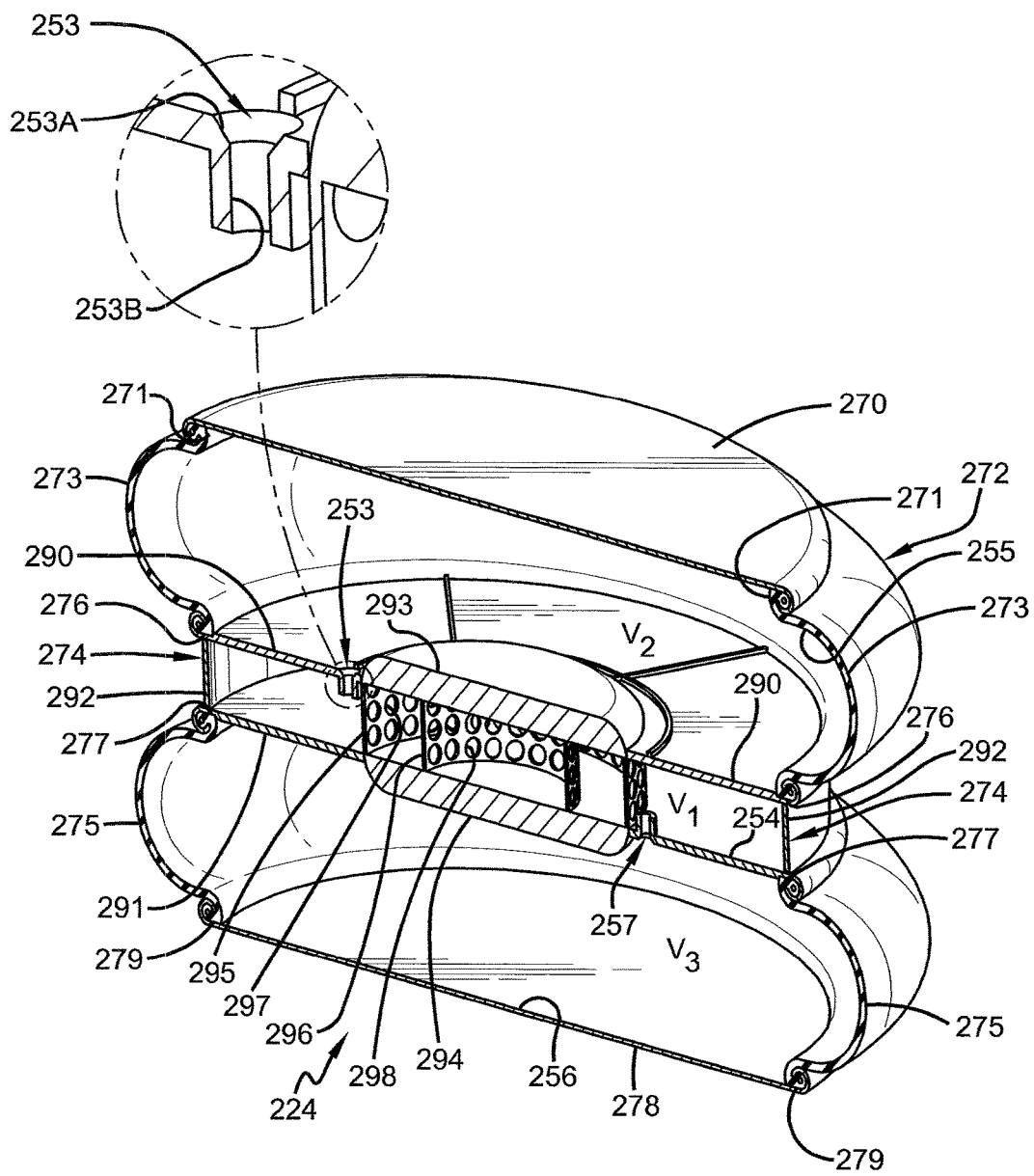
FIG. 6 is an alternate top perspective cross-sectional view of the first exemplary embodiment damping convoluted air spring of the present invention shown in FIG. 3.
Figure 7:
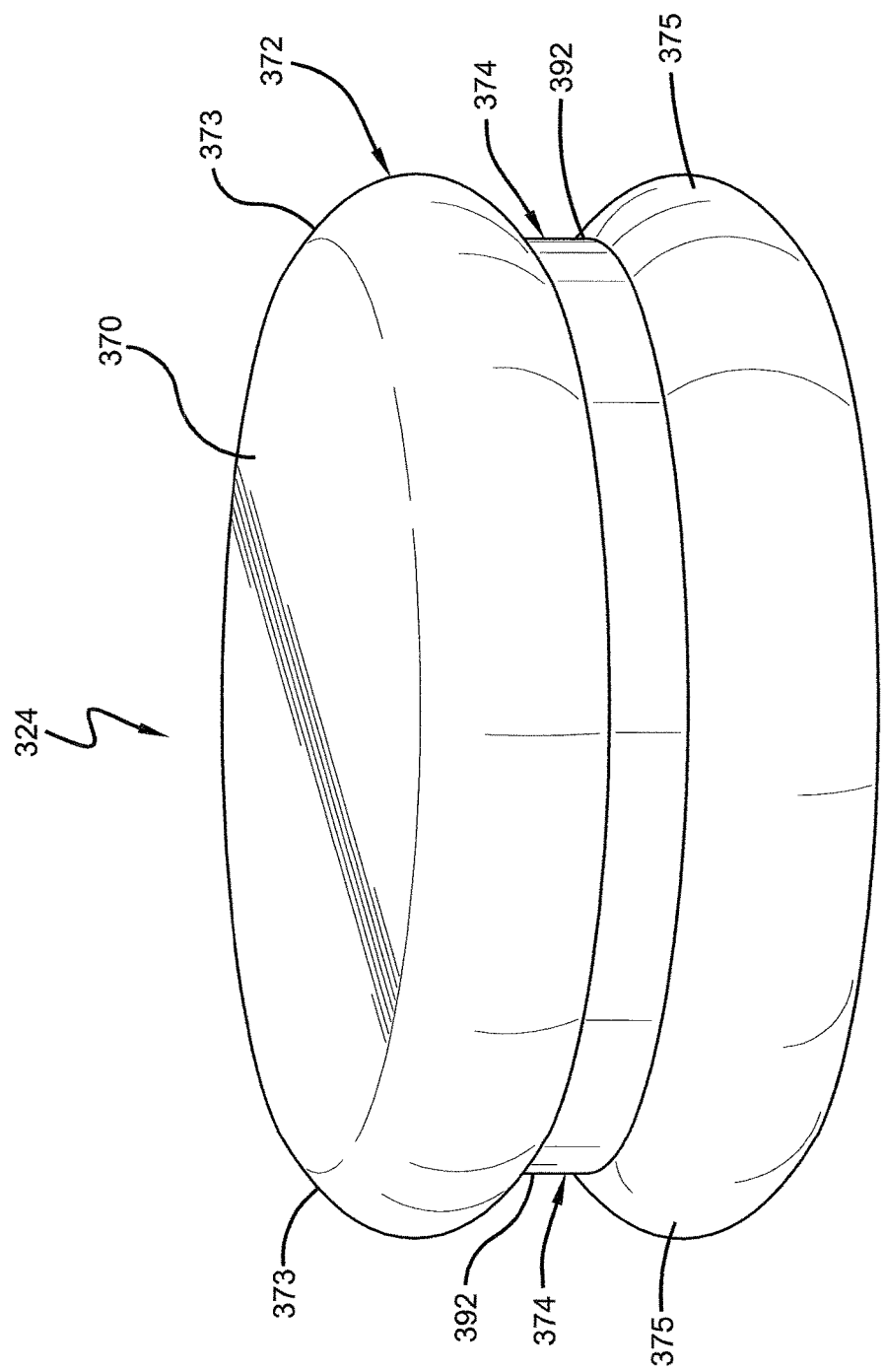
FIG. 7 is a top perspective view of a second exemplary embodiment damping convoluted air spring of the present invention, showing the upper and lower lobes of the air spring separated by a rigid intermediate chamber.
Figure 8:
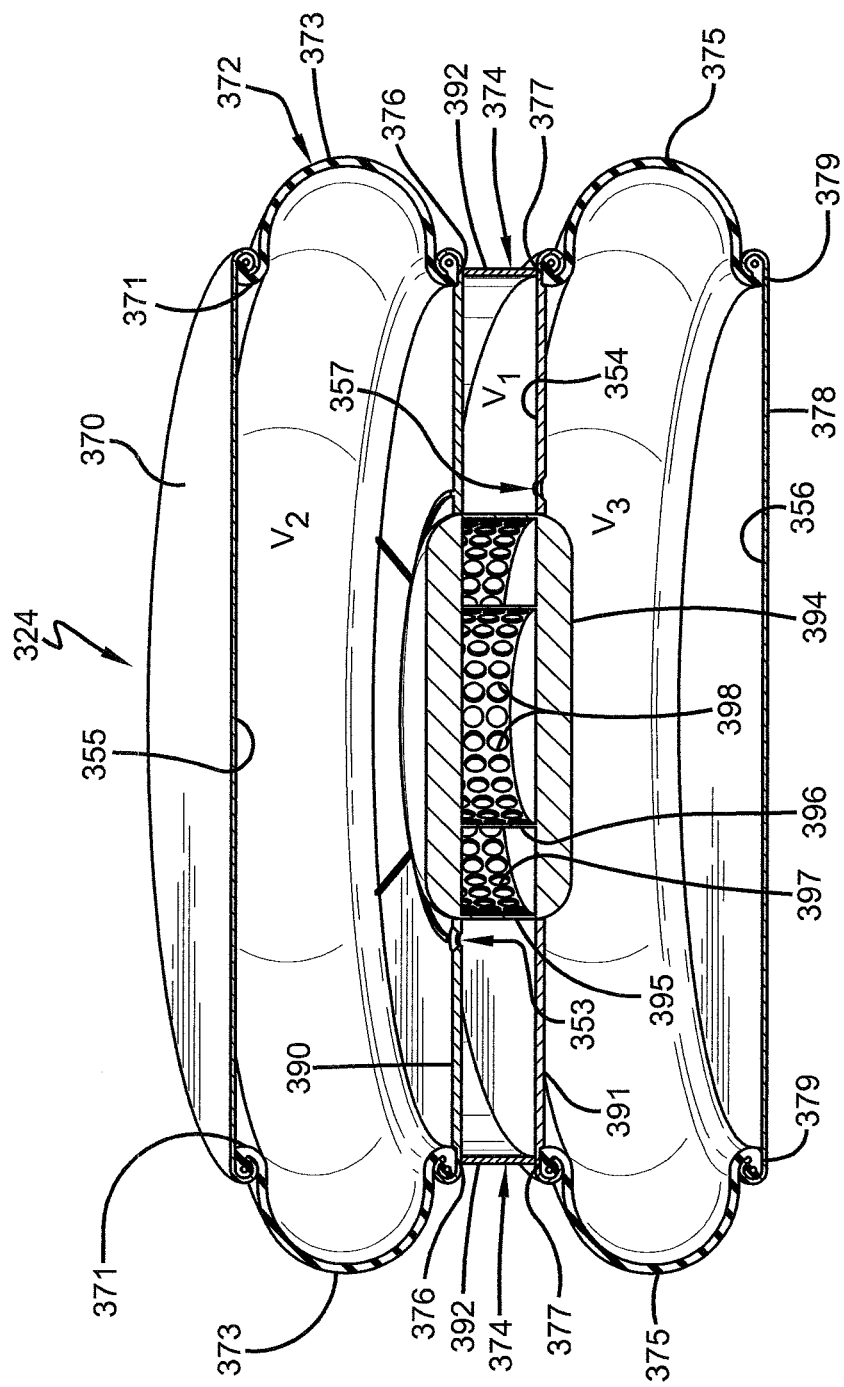
FIG. 8 is a top perspective cross-sectional view of the second exemplary embodiment damping convoluted air spring of the present invention shown in FIG. 7, showing the intermediate chamber disposed between and in fluid communication with the upper and lower lobes of the air spring via a pair of spaced apart openings.

As best shown in FIG. 6, top plate opening 253 is generally circular and includes a chamfered top portion 253A and a downwardly extending tube-like portion 253B. Likewise, bottom plate opening 257 is generally circular and includes a chamfered bottom portion 257A and an upwardly extending tube-like portion 257B (FIG. 5). It should be understood that openings 253,257 could have different shapes, sizes, and interior contours, without changing the overall concept or operation of the present invention.

Figure 13:
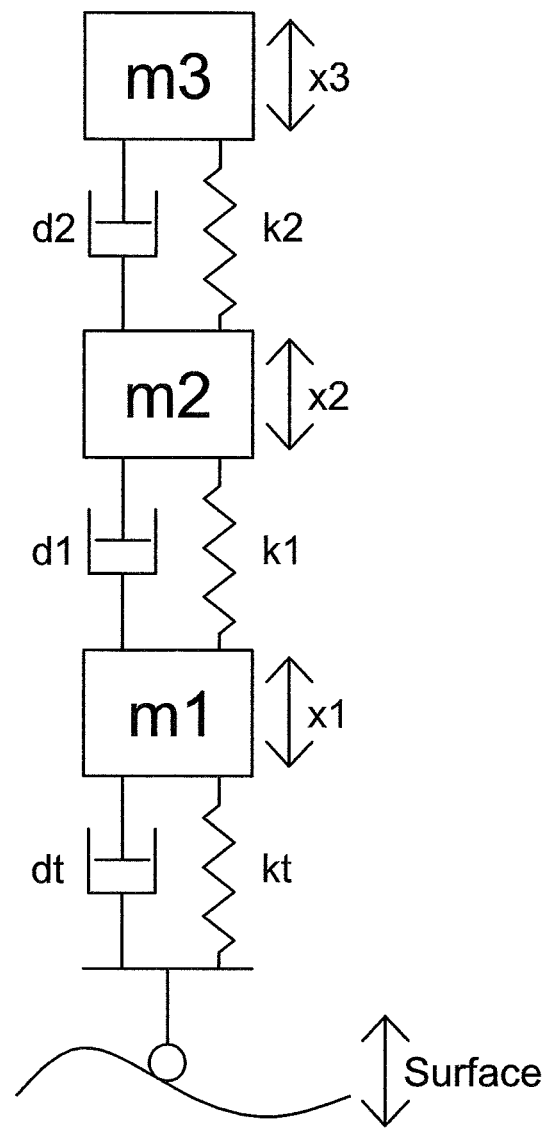
FIG. 13 is a schematic representation of the first and second exemplary embodiment damping convoluted air springs of the present invention, showing the rigid lobe mass connected and suspended between the lobes of the convoluted air spring and showing the unsprung mass located generally below the air spring and the sprung mass located generally above the air spring.

In accordance with another important feature of the present invention, rigid middle lobe 274 includes a mass m2 that is a total sum of the masses of its components including top plate 290, bottom plate 291, circular wall 292, and structures formed in the components of the rigid middle lobe, such as bumpers 293, 294 and support columns 295, 296. Preferably, rigid middle lobe 274 has mass m2 of from about 1 lb. to about 10 lbs. More preferably, rigid middle lobe 274 has mass m2 of about 3 lbs. when an unsprung mass m1 of the axle/suspension system is about 1,000 lbs. and a sprung mass m3 of the vehicle is about 9,000 lbs. It should be understood that mass m2 of rigid middle lobe 274 could be varied depending upon the weight of the unsprung mass m1 below it and the weight of the sprung vehicle mass m3 above it, in order to provide mass damping across a selected frequency range. The frequency range of the mass damping may also be related to the pliability or elasticity of upper and lower lobes 273, 275 d2/k2 and d1/k1 (FIG. 13), where d1 and d2 are the spring distances separating mass m1 from m2 and m2 from m3, respectively, and k1 and k2 are the associated spring constants, and the volumes of air they contain.

Having now described the structure of first exemplary embodiment damping convoluted air spring 224 of the present invention, the operation of the air spring will be described in detail below.

When axle assembly 30 of axle/suspension system 10 experiences a jounce event, such as when the vehicle wheels encounter a curb or a raised bump in the road, the axle assembly moves vertically upwardly toward the vehicle chassis. In such a jounce event, upper air spring chamber 255 and lower air spring chamber 256 are compressed by axle/suspension system 10 as the wheels of the vehicle travel over the curb or the raised bump in the road. The compression of upper air spring chamber 255 and lower air spring chamber 256 causes the internal pressure of the upper and lower air spring chambers to increase. As a result, a pressure differential is created between upper and lower air spring chambers 255,256 and intermediate chamber 254. This pressure differential causes air to flow from upper and lower air spring chambers 255,256, through top plate opening 253 and bottom plate opening 257, respectively, into intermediate chamber 254, and vice versa. The flow of air back and forth through top plate opening 253 and bottom plate opening 257 causes damping to occur at a first frequency range where optimal damping of axle/suspension system 10 is critical. The first frequency range is typically at about 1.8 Hz, and is known as the body bounce mode. Air will continue to flow back and forth from intermediate chamber 254 to the upper and lower air spring chambers 255,256, and vice versa, until equilibrium is reached and the pressures in the upper air spring chamber, the intermediate chamber and the lower air spring chamber have equalized.

Conversely, when axle assembly 30 of axle/suspension system 10 experiences a rebound event, such as when the vehicle wheels encounter a large hole or depression in the road, the axle assembly moves vertically downwardly away from the vehicle chassis. In such a rebound event, upper air spring chamber 255 and lower air spring chamber 256 are extended by axle/suspension system 10 as the wheels of the vehicle travel into the hole or depression in the road. The extension of upper air spring chamber 255 and lower air spring chamber 256 causes the internal pressure of the upper and lower air spring chambers to decrease. As a result, a pressure differential is created between upper and lower air spring chambers 255,256 and intermediate chamber 254. This pressure differential causes air to flow from intermediate chamber 254 through top plate opening 253 and bottom plate opening 257 into upper and lower air spring chambers 255,256, respectively, and vice versa. The flow of air back and forth through top plate opening 253 and bottom plate opening 257 causes damping to occur at the first frequency range where optimal damping of axle/suspension system 10 is critical. The first frequency range is typically at about 1.8 Hz, the body bounce mode. Air will continue to flow back and forth from intermediate chamber 254 to the upper and lower air spring chambers 255,256, and vice versa, until equilibrium is reached and the pressures in the upper air spring chamber, the intermediate chamber and the lower air spring chamber have equalized.

With continued reference to FIGS. 3-6, rigid middle lobe 274 is connected or suspended between and by pliable or elastic upper and lower lobes 273, 275. The pliability or elasticity of lobes 273, 275 enables rigid middle lobe 274 to move relatively freely or float between air spring top plate 270 and bottom plate 278. The relative free movement or floating movement of rigid middle lobe 274, combined with mass m2 of the rigid middle lobe, promotes mass damping of damping convoluted air spring 224. More particularly, in a jounce event as described above, axle assembly 30 moves vertically upwardly toward the vehicle chassis. Conversely, in a rebound event as described above, axle assembly 30 moves vertically downwardly away from the vehicle chassis. Because rigid middle lobe 274 has a mass, the rigid middle lobe 274 tends to stay at its original position due to the inertia of the mass of the rigid middle lobe either in a jounce event or in a rebound event. The tendency of staying at its original position cooperating with the pliability or elasticity of lobes 273, 275 makes rigid middle lobe 274 move generally opposite or counter to the motion of axle assembly 30. This counter motion of rigid middle lobe 274 dissipates the motion energy of axle assembly 30, thereby promoting a mass damping of damping convoluted air spring 224 at a second frequency range. The second frequency range where optimal damping of the axle/suspension system 10 is critical is typically at about 13 Hz, and is known as the wheel hop mode.

Turning now to FIGS. 7-10, a second exemplary embodiment damping convoluted air spring is shown generally at reference numeral 324 and will be described in detail below. Like prior art non-damping convoluted air spring 24, second exemplary embodiment damping convoluted air spring 324 can be utilized on axle/suspension system 10 as described above, but can also be utilized on other types of air-ride axle/suspension systems for vehicles, including those used on trucks, trailers and the like, without changing the overall concept or operation of the present invention.

Second exemplary embodiment damping convoluted air spring 324 includes an air spring top plate 370 formed from steel or other sufficiently rigid material that is operatively attached to a top end 371 of a bellows 372 in a well-known manner. Bellows 372 includes an upper lobe 373, a rigid middle lobe 374, and a lower lobe 375. Upper lobe 373 and lower lobe 375 are formed generally from rubber or other elastic and/or pliable material. Rigid middle lobe 374 is formed from steel or other sufficiently robust material, so that the interior volume of the chamber does not change during dynamic spring movements. An upper girdle hoop 376 is disposed between upper lobe 373 and rigid middle lobe 374. A lower girdle hoop 377 is disposed between rigid middle lobe 374 and lower lobe 375. An air spring bottom plate 378, formed from steel or other sufficiently robust material, is operatively attached to a bottom end 379 of lower lobe 375 of bellows 372 in a well-known manner. A pair of fastening means (not shown) engage a pair of fasteners (not shown) to attach air spring bottom plate 378 to a platform (not shown) that is in turn mounted on the axle assembly. It should be understood that second exemplary embodiment damping convoluted air spring 324 of the present invention could include more than three lobes, such as four or more lobes, wherein at least one of the plurality of lobes is rigid while the other lobes are flexible and/or elastic, without changing the overall concept or operation of the present invention.

Rigid middle lobe 374 includes a top plate 390 and a bottom plate 391. Top plate 390 and bottom plate 391 are generally circular in shape and are spaced from one another. An outer vertically extending generally circular wall 392 is formed around the outer diameter of the top plate and bottom plate and rigidly connects the top plate to the bottom plate. Top plate 390 is formed with an upwardly extending bumper 393 disposed at its center. Bottom plate 391 is formed with a downwardly extending bumper 394 disposed at its center. A pair of outer and inner generally circular vertically extending support columns 395,396, respectively, are arranged concentrically to each other, extend between top plate 390 and bottom plate 391, and connect the central portion of the top plate to the central portion of the bottom plate. Outer and inner support columns 395,396 are formed with a plurality of openings 397, 398, respectively in order to promote the free flow of air within rigid middle lobe 374. Outer and inner support columns 395,396 provide bumper support to rigid middle lobe 374, and also serve to prevent air spring bottom plate 378 from contacting air spring top plate 370 during operation of the vehicle and during "low pressure" or "no air" events. Top plate 390, bottom plate 391 and outer wall 392 of rigid middle lobe 374 form an intermediate chamber 354 having a volume V1.

Air spring top plate 370, upper lobe 373 and rigid middle lobe top plate 390 form an upper air spring chamber 355 having a volume V2.

Air spring bottom plate 378, lower lobe 375 and rigid middle lobe bottom plate 391 form a lower air spring chamber 356 having a volume V3.

In accordance with an important feature of the present invention, an opening 353 is formed in top plate 390 of rigid middle lobe 374. Opening 353 provides fluid communication between intermediate chamber 354 and upper air spring chamber 355. An opening 357 is formed in bottom plate 391 of rigid middle lobe 374. Opening 357 provides fluid communication between intermediate chamber 354 and lower air spring chamber 356.

Figure 9:
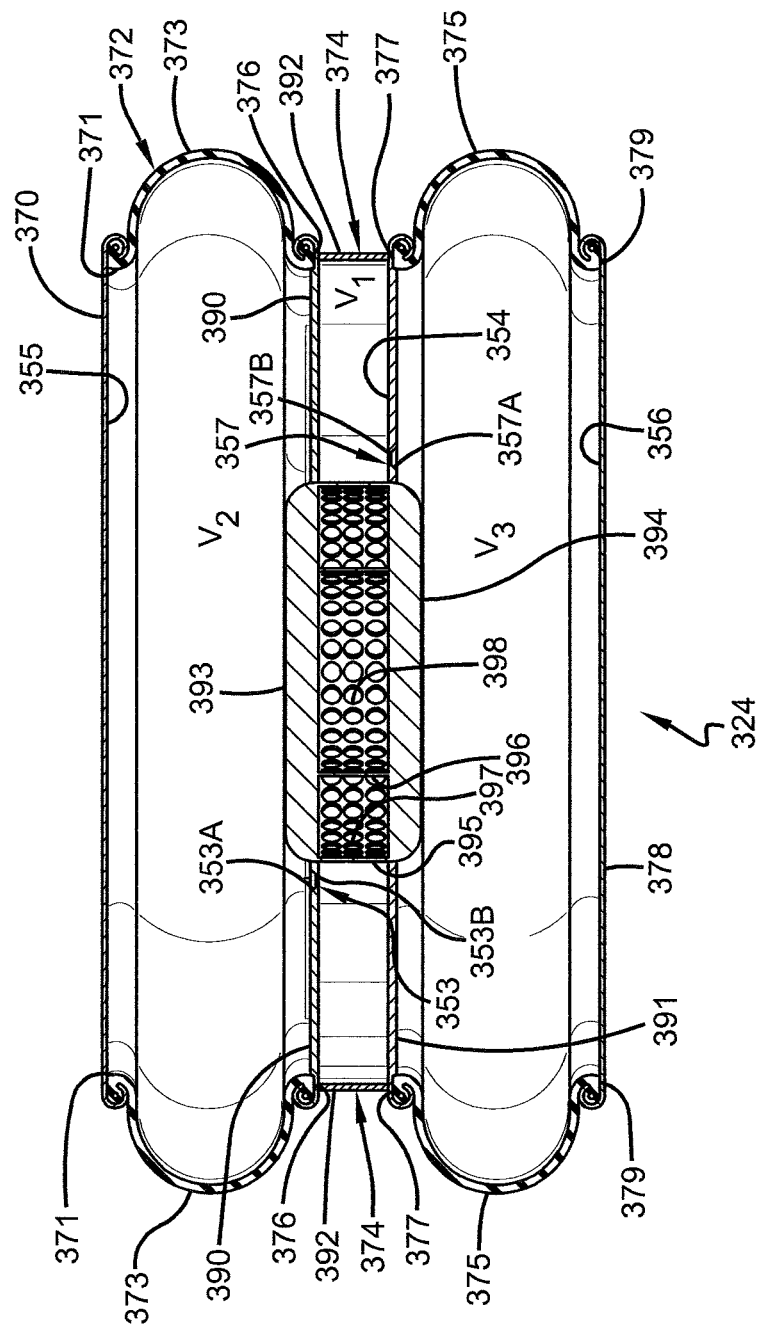
FIG. 9 is an elevational cross-sectional view of the second exemplary embodiment damping convoluted air spring of the present invention shown in FIG. 7.
Figure 10:
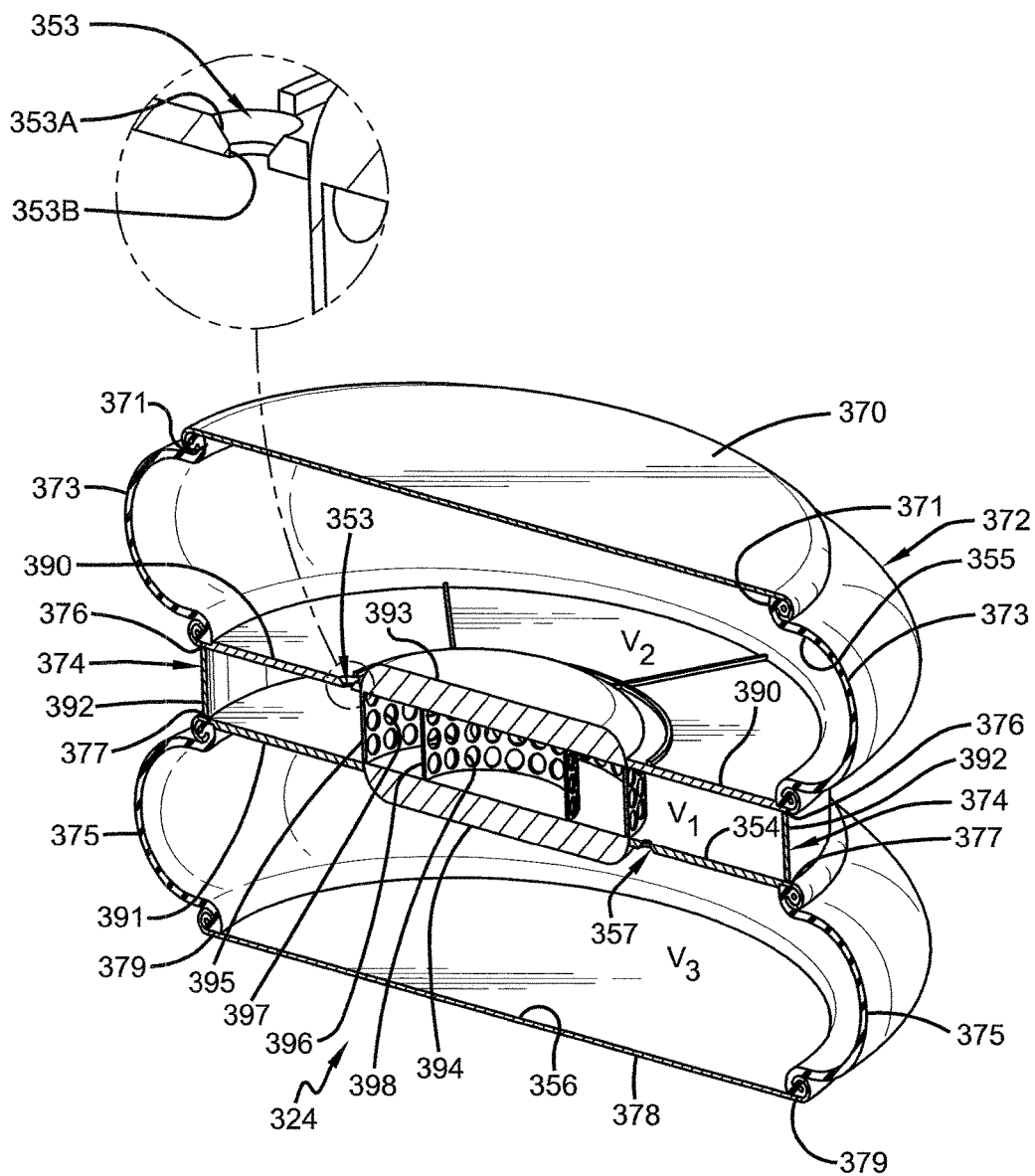
FIG. 10 is an alternate top perspective cross-sectional view of the second exemplary embodiment damping convoluted air spring of the present invention shown in FIG. 7.

As best shown in FIG. 10, top plate opening 353 is generally circular and includes a conically shaped top portion 353A and a downwardly extending tube-like portion 353B. Likewise, bottom plate opening 357 is generally circular and includes a conically shaped bottom portion 357A and an upwardly extending tube-like portion 357B (FIG. 9). It should be understood that openings 353,357 could have different shapes, sizes, and interior contours, without changing the overall concept or operation of the present invention.

In accordance with another important feature of the present invention, rigid middle lobe 374 includes a mass m2 that is a total sum of the masses of its components including top plate 390, bottom plate 391, circular wall 392, and structures formed in the components of the rigid middle lobe, such as bumpers 393, 394 and support columns 395, 396. Preferably, rigid middle lobe 374 has mass m2 of from about 1 lb. to about 10 lbs. More preferably, rigid middle lobe 374 has mass m2 of about 3 lbs. when an unsprung mass m1 of the axle/suspension system is about 1,000 lbs. and a sprung mass m3 of the vehicle is about 9,000 lbs. It should be understood that mass m2 of rigid middle lobe 374 could be altered depending upon the weight of the unsprung mass m1 below it and the weight of the sprung vehicle mass m3 above it, in order to provide mass damping across a selected frequency range. The frequency range of the mass damping may also be related to the pliability or elasticity of upper and lower lobes 373, 375 d2/k2 and d1/k1 (FIG. 13), where d1 and d2 are the spring distances separating mass m1 from m2 and m2 from m3, respectively, and k1 and k2 are the associated spring constants, and the volumes of air they contain.

Having now described the structure of second exemplary embodiment damping convoluted air spring 324 of the present invention, the operation of the air spring will be described in detail below.

When axle assembly 30 of axle/suspension system 10 experiences a jounce event, such as when the vehicle wheels encounter a curb or a raised bump in the road, the axle assembly moves vertically upwardly toward the vehicle chassis. In such a jounce event, upper air spring chamber 355 and lower air spring chamber 356 are compressed by axle/suspension system 10 as the wheels of the vehicle travel over the curb or the raised bump in the road. The compression of upper air spring chamber 355 and lower air spring chamber 356 causes the internal pressure of the upper and lower air spring chambers to increase. As a result, a pressure differential is created between upper and lower air spring chambers 355,356 and intermediate chamber 354. This pressure differential causes air to flow from upper and lower air spring chambers 355,356, through top plate opening 353 and bottom plate opening 357, respectively, into intermediate chamber 354, and vice versa. The flow of air back and forth through top plate opening 353 and bottom plate opening 357 causes damping to occur at a first frequency range where optimal damping of axle/suspension system 10 is critical. The first frequency range is typically about 1.8 Hz, and is known as body bounce mode. Air will continue to flow back and forth from intermediate chamber 354 to the upper and lower air spring chambers 355,356, and vice versa, until equilibrium is reached and the pressures in the upper air spring chamber, the intermediate chamber and the lower air spring chamber have equalized.

Conversely, when axle assembly 30 of axle/suspension system 10 experiences a rebound event, such as when the vehicle wheels encounter a large hole or depression in the road, the axle assembly moves vertically downwardly away from the vehicle chassis. In such a rebound event, upper air spring chamber 355 and lower air spring chamber 356 are extended by axle/suspension system 10 as the wheels of the vehicle travel into the hole or depression in the road. The extension of upper air spring chamber 355 and lower air spring chamber 356 causes the internal pressure of the upper and lower air spring chambers to decrease. As a result, a pressure differential is created between upper and lower air spring chambers 355,356 and intermediate chamber 354. This pressure differential causes air to flow from intermediate chamber 354 through top plate opening 353 and bottom plate opening 357 into upper and lower air spring chambers 355,356, respectively, and vice versa. The flow of air back and forth through top plate opening 353 and bottom plate opening 357 causes damping to occur at a first frequency range where optimal damping of axle/suspension system 10 is critical. The first frequency range is typically about 1.8 Hz, the body bounce mode. Air will continue to flow back and forth from intermediate chamber 354 to the upper and lower air spring chambers 355,356, and vice versa, until equilibrium is reached and the pressures in the upper air spring chamber, the intermediate chamber and the lower air spring chamber have equalized.

With continued reference to FIGS. 7-10, rigid middle lobe 374 is connected or suspended between and by pliable or elastic upper and lower lobes 373, 375. The pliability or elasticity of lobes 373, 375 enables rigid middle lobe 374 to move relatively freely or float between air spring top plate 370 and bottom plate 378. The relative free movement or floating movement of rigid middle lobe 374, combined with mass m2 of the rigid middle lobe, promotes mass damping of damping convoluted air spring 324. More particularly, in a jounce event as described above, axle assembly 30 moves vertically upwardly toward the vehicle chassis. Conversely, in a rebound event as described above, axle assembly 30 moves vertically downwardly away from the vehicle chassis. Because rigid middle lobe 374 has a mass, the rigid middle lobe 374 tends to stay at its original position due to the inertia in either a jounce event or a rebound event. The tendency of staying at its original position cooperating with the pliability or elasticity of lobes 373, 375 makes rigid middle lobe 374 move generally opposite or counter to the motion of axle assembly 30. This counter motion of rigid middle lobe 374 dissipates the motion energy of axle assembly 30, thereby promoting a mass damping of damping convoluted air spring 324 at a second frequency range. The second frequency range where optimal damping of the axle/suspension system 10 is critical is typically about 13 Hz, and is known as the wheel hop mode.

Figure 11:
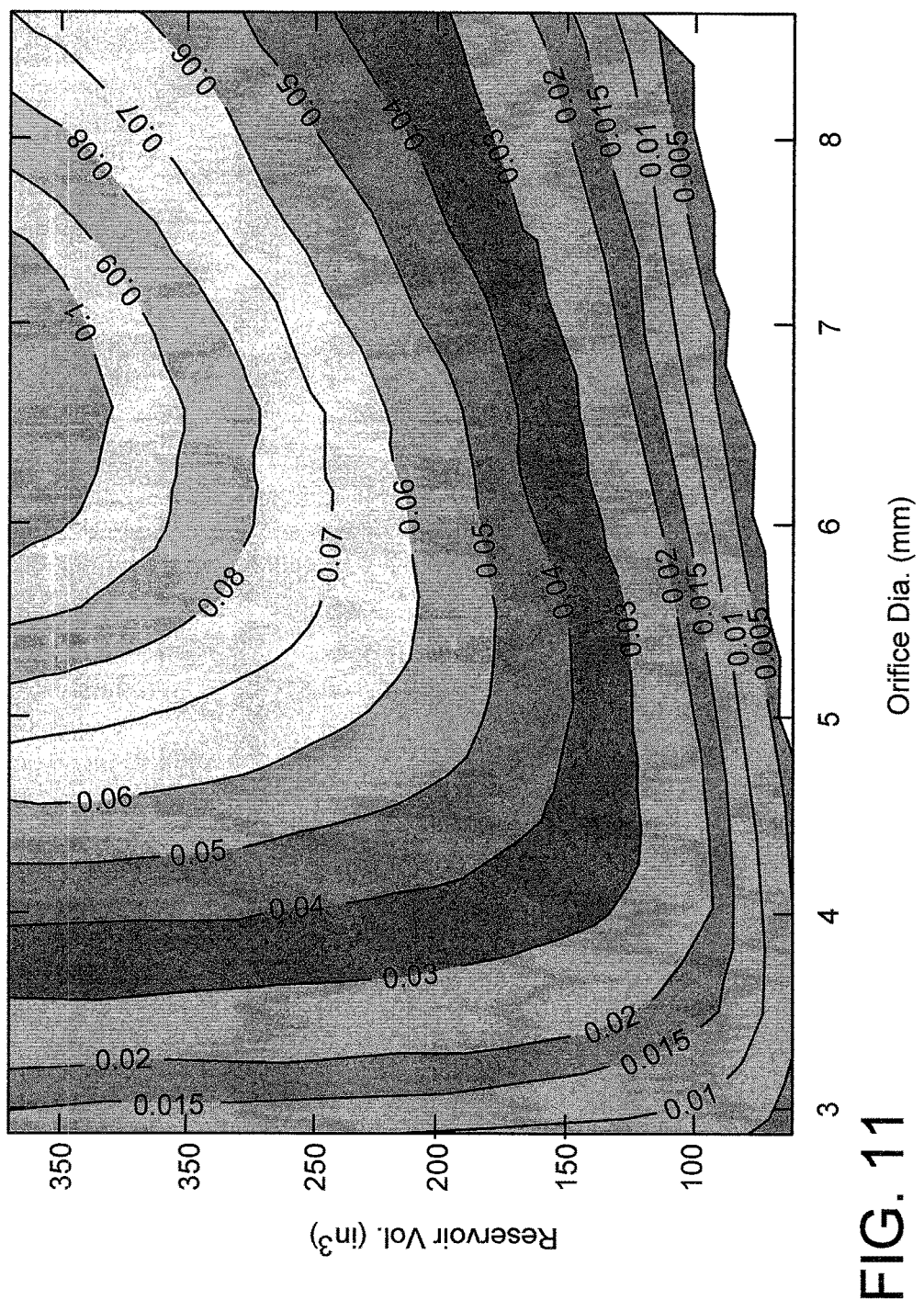
FIG. 11 is a graph showing the damping levels of the first and second exemplary embodiment damping convoluted air springs of the present invention.

Turning now to FIG. 11, the relative level of damping provided by damping convoluted air springs 224,324 is shown with respect to a given range of intermediate chamber 254,354 volumes V1 over a given range of opening diameter sizes for openings 253,257 and 353,357.

Figure 12:
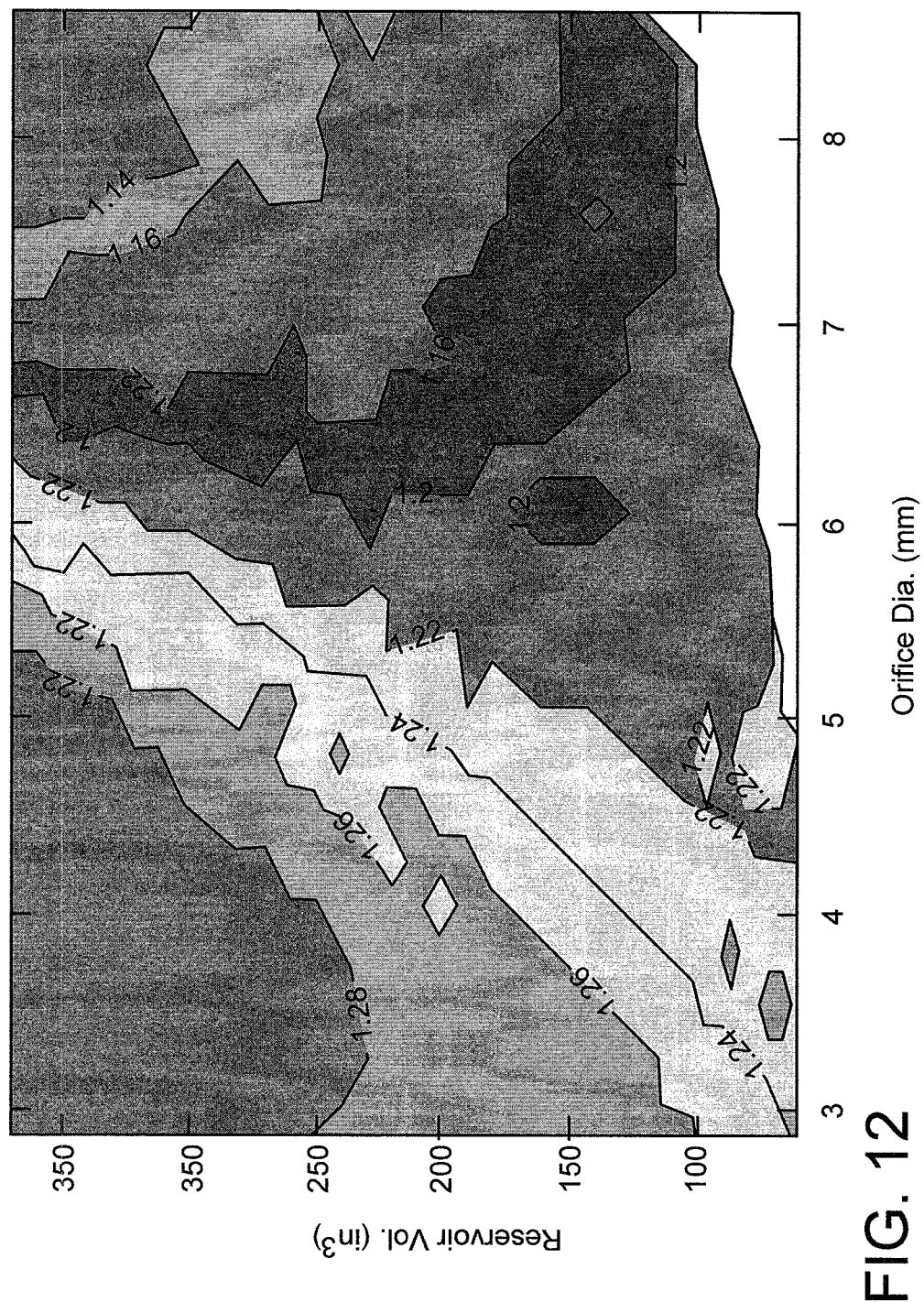
FIG. 12 is a graph showing the natural frequency of the first and second exemplary embodiment damping convoluted air springs of the present invention.

Turning now to FIG. 12, the natural frequency of the damping provided by damping convoluted air spring 224, 324 of the present invention is shown with respect to a given range of intermediate chamber 254,354 volumes V1 over a given range of opening diameter sizes for openings 253,257 and 353,357.

Figure 14:
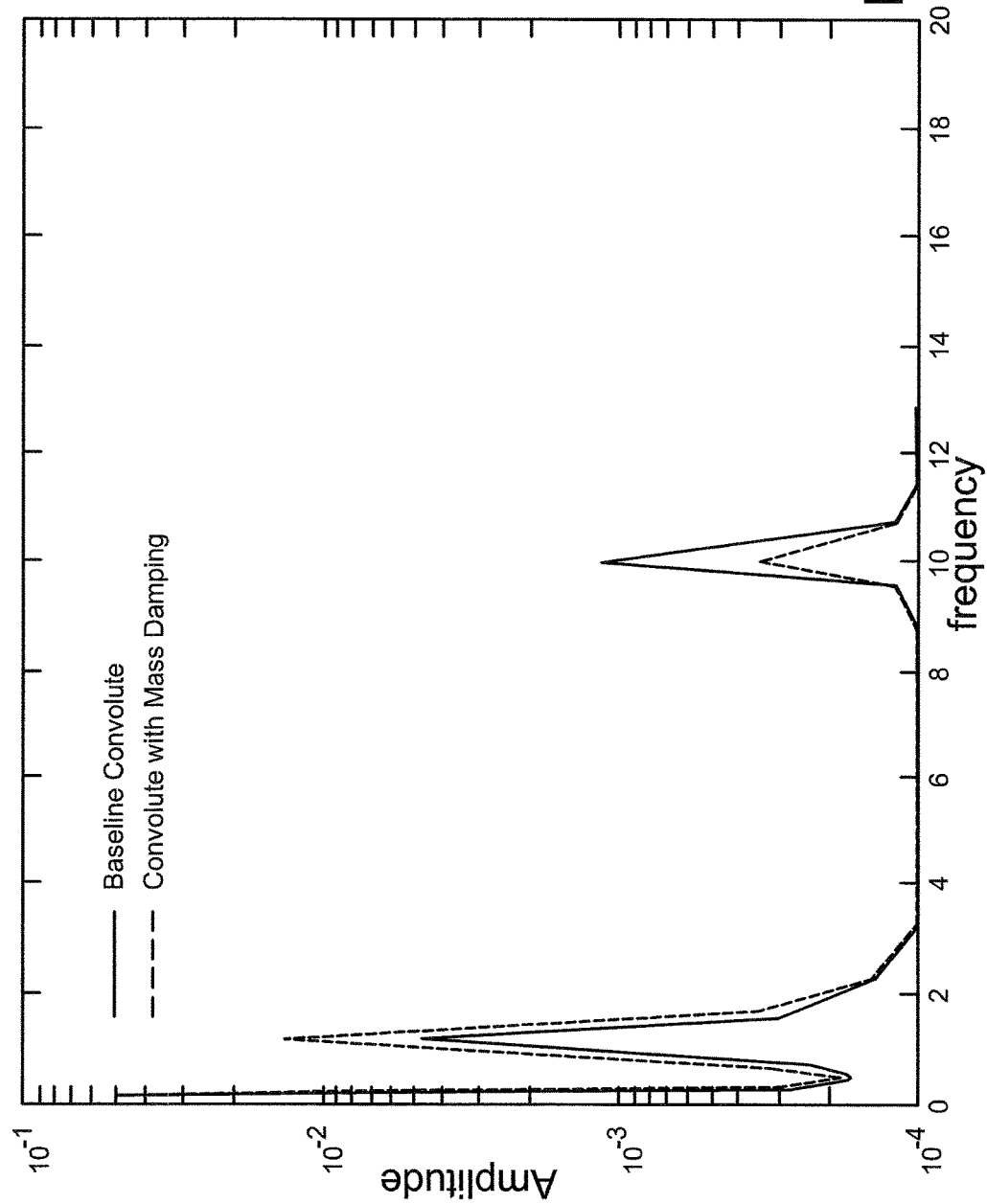
FIG. 14 is a graph showing the vehicle body acceleration versus the resonant frequency of the axle suspension system for air springs with and without mass damping.

Turning now to FIG. 14, the amplitude of vehicle body acceleration for air springs without mass damping (Baseline Convolute) and air springs with mass damping (Convolute with Mass Damping) such as air springs 224,324 is shown with respect to the given range of frequencies of vibration the vehicle axle/suspension system experiences during operation.

Damping convoluted air springs 224,324 for vehicles of the present invention, overcome the problems associated with prior art convoluted air springs by providing a damping convoluted air spring that is self-contained, resulting in damping characteristics at two different frequency ranges for the air spring, while using generally smaller and fewer parts than prior art damping convoluted air springs that utilize external tanks and the like. Damping convoluted air springs 224,324 for vehicles include an intermediate chamber 254, 354, respectively, contained within the air spring that is in fluid communication with upper air spring chamber 255,355, respectively, and lower air spring chamber 256,356, respectively, to provide restricted airflow between the various lobes of the air spring and the rigid chamber in order to provide damping characteristics to the air spring. These damping characteristics can be tuned for a given application, based upon intermediate chamber 254,354 volume V1, upper and lower air spring chamber 255,256,355,356 volumes V2 and V3, respectively, and the size, shape, length, and/or number of openings 253,257,353,357 formed between and communicating with the upper and lower lobes and the intermediate chamber of the air spring. By providing an air spring for vehicles having damping characteristics, the shock absorber of the axle/suspension system can be eliminated or its size reduced, reducing complexity, saving weight and cost, and allowing the vehicle to haul more cargo. Moreover, elimination of the external tank, valves and hardware of the prior art damping convoluted air spring potentially eliminates costly repairs and/or maintenance costs associated with these more complicated systems, as well as reducing weight. In addition, damping convoluted air spring 224,324 for vehicles of the present invention can provide damping to certain vehicle applications that, in the past, had not utilized shock absorbers and instead allowed the suspension to operate without damping. The introduction of damping to these vehicle applications increases the life of the axle/suspension system and its component parts. Further, the damping convoluted air spring 224,324 of the present invention provides damping characteristics optimized at two different frequency ranges: at a first frequency range, damping is promoted by the restricted airflow between the rigid chamber and the lobes; and at a second frequency, mass damping is promoted by the rigid lobe mass motion generally opposite or counter to the motion of the axle/suspension system.

It is contemplated that exemplary embodiment damping convoluted air springs 224,324 of the present invention could be utilized on tractor-trailers, medium-duty vehicles, including trucks, and heavy-duty vehicles, such as buses, trucks, trailers and the like, having one or more than one axle without changing the overall concept or operation of the present invention. It is further contemplated that exemplary embodiment damping convoluted air springs 224,324 of the present invention could be utilized on vehicles having frames or subframes which are movable or non-movable without changing the overall concept or operation of the present invention. It is yet even further contemplated that exemplary embodiment damping convoluted air springs 224,324 of the present invention could be utilized on all types of air-ride axle/suspension systems known to those skilled in the art without changing the overall concept or operation of the present invention, including lift and non-lift type axle/suspension systems. It is also contemplated that exemplary embodiment damping convoluted air springs 224,324 of the present invention could be utilized on axle/suspension systems having an overslung/top-mount configuration or an underslung/bottom-mount configuration, without changing the overall concept or operation of the present invention. It is also contemplated that exemplary embodiment damping convoluted air springs 224,324 of the present invention could be utilized in conjunction with other types of air-ride rigid beam-type axle/suspension systems such as those using U-bolts, U-bolt brackets/axle seats and the like, without changing the overall concept or operation of the present invention. It is further contemplated that exemplary embodiment damping convoluted air springs 224,324 of the present invention could be formed from various materials, without changing the overall concept or operation of the present invention. It is even contemplated that exemplary embodiment damping convoluted air springs 224,324 could be utilized in combination with prior art shock absorbers and other similar devices and the like, without changing the overall concept or operation of the present invention.

It is further contemplated that more than one opening 253,257,353,357 in each air spring top and bottom plate 270,370,278,378, respectively, could be utilized, without changing the overall concept or operation of the present invention. It is contemplated that the concepts shown in exemplary embodiment damping convoluted air springs 224,324 of the present invention could be utilized in any type of air spring utilized in conjunction with vehicles, without changing the overall concept or operation of the present invention.

It is also contemplated that intermediate chamber 254,354 could be located within any lobe of the convoluted air spring, without changing the overall concept or operation of the present invention. It is even further contemplated that the present invention could be used on any type of convoluted air spring, having three or more lobes, without changing the overall concept or operation of the present invention.

The present invention has been described with reference to specific embodiments. It is understood that this description and illustration is by way of example and not by way of limitation. Potential modifications and alterations will occur to others upon a reading and understanding of this disclosure, and it is understood that the invention includes all such modifications and alterations and equivalents thereof.

Accordingly, the damping convoluted air spring is simplified, provides an effective, safe, inexpensive and efficient structure and method which achieves all the enumerated objectives, provides for eliminating difficulties encountered with prior convoluted air springs, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the damping convoluted air spring is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A damping convoluted air spring for use in vehicle axle/suspension systems comprising:

a top plate, a bottom plate, and a bellows, said bellows including a flexible first lobe, a second lobe, and a flexible third lobe operatively connected to one another, said first lobe operatively mounted on said top plate, said third lobe operatively mounted on said bottom plate, said air spring having at least a first restricted fluid communication between said first and second lobes and at least a second restricted fluid communication between said second and third lobes, and said second lobe including a fixed volume under pressure to provide damping to the air spring during operation of said vehicle.

2. The damping convoluted air spring for use in vehicle axle/suspension systems of claim 1, wherein said second lobe is rigid.

3. The damping convoluted air spring for use in vehicle axle/suspension systems of claim 2, wherein said second lobe is disposed between the first and the third lobes.

4. The damping convoluted air spring for use in vehicle axle/suspension systems of claim 1, wherein said second lobe further comprises an upper dividing plate spaced a distance from a lower dividing plate and one or more circular support walls disposed between and connected to the upper dividing plate and the lower dividing plate.

5. The damping convoluted air spring for use in vehicle axle/suspension systems of claim 4, wherein said second lobe further comprises at least one center support column connected between the upper dividing plate and the lower dividing plate.

6. The damping convoluted air spring for use in vehicle axle/suspension systems of claim 5, wherein the at least one center support column includes one or more support column openings to promote free air flow within the fixed volume.

7. The damping convoluted air spring for use in vehicle axle/suspension systems of claim 4, further comprising a bumper extending from at least one of the upper dividing plate and the lower dividing plate and into an adjacent lobe.

8. The damping convoluted air spring for use in vehicle axle/suspension systems of claim 1, wherein said at least one first restricted fluid communication and said at least one second restricted fluid communication each further comprise an opening with a chamfered portion and a tube portion.

9. The damping convoluted air spring for use in vehicle axle/suspension systems of claim 1, wherein said at least one first restricted fluid communication and said at least one second restricted fluid communication each further comprise an opening with a conical portion and a tube portion.

10. The damping convoluted air spring for use in vehicle axle/suspension systems of claim 1, wherein the flow of air through the at least one first restricted fluid communication and the at least one second restricted fluid communication provides damping at a first frequency range.

11. The damping convoluted air spring for use in vehicle axle/suspension systems of claim 1, wherein said second lobe has a mass that is between 1 lb and 10 lbs.

12. The damping convoluted air spring for use in vehicle axle/suspension systems of claim 11, wherein said second lobe provides mass damping at a second frequency range.

13. The damping convoluted air spring for use in vehicle axle/suspension systems of claim 1, wherein said second lobe has a mass of about 3 lbs.

14. The damping convoluted air spring for use in vehicle axle/suspension systems of claim 1, wherein the bellows further comprises an upper girdle hoop being disposed externally about the bellows between the first lobe and the second lobe.

15. The damping convoluted air spring for use in vehicle axle/suspension systems of claim 14, wherein the bellows further comprises a lower girdle hoop being disposed externally about the bellows between the second lobe and the third lobe.

* * * * *